US012255030B2

(12) United States Patent
Zhang et al.

(10) Patent No.: US 12,255,030 B2
(45) Date of Patent: Mar. 18, 2025

(54) KEYSWITCH ASSEMBLY

(71) Applicants: LITE-ON Technology (Chang Zhou) Co., LTD., Jiangsu Province (CN); LITE-ON Technology Corporation, Taipei (TW)

(72) Inventors: BingWei Zhang, Jiangsu Province (CN); XiaoQiang Liang, Jiangsu Province (CN); Jia-Xun Wu, Taipei (TW); Lei Shi, Jiangsu Province (CN)

(73) Assignees: LITE-ON Technology (Chang Zhou) Co., LTD., Jiangsu Province (CN); LITE-ON Technology Corporation, Taipei (TW)

( * ) Notice: Subject to any disclaimer, the term of this patent is extended or adjusted under 35 U.S.C. 154(b) by 0 days.

(21) Appl. No.: 17/015,604

(22) Filed: Sep. 9, 2020

(65) Prior Publication Data

US 2020/0411253 A1 Dec. 31, 2020

Related U.S. Application Data

(63) Continuation-in-part of application No. 16/368,349, filed on Mar. 28, 2019, now abandoned.

(30) Foreign Application Priority Data

Mar. 29, 2018 (CN) ......................... 201820438380.0

(51) Int. Cl.

| | |
|---|---|
| ***H01H 3/12*** | (2006.01) |
| ***H01H 13/14*** | (2006.01) |
| *H01H 13/20* | (2006.01) |

(52) U.S. Cl.
CPC ............ *H01H 3/125* (2013.01); *H01H 13/14* (2013.01); *H01H 13/20* (2013.01)

(58) Field of Classification Search
CPC .. H01H 13/14; H01H 13/20; H01H 2221/058; H01H 2221/08; H01H 2209/01; H01H 2217/01; H01H 3/125; H01H 13/7065; H01H 3/122; H01H 3/12
USPC ......................................... 200/341, 344, 345
See application file for complete search history.

(56) References Cited

U.S. PATENT DOCUMENTS

| | | | | |
|---|---|---|---|---|
| 10,026,566 | B1 * | 7/2018 | Chen | H01H 13/705 |
| 2002/0014398 | A1 * | 2/2002 | Ito | H01H 3/125 200/344 |
| 2016/0147312 | A1 * | 5/2016 | Chen | H01H 13/7065 400/495 |
| 2016/0148763 | A1 | 5/2016 | Chen | |

(Continued)

*Primary Examiner* — Lheiren Mae A Caroc

(74) *Attorney, Agent, or Firm* — Umberg Zipser LLP; Ryan Dean

(57) ABSTRACT

A keyswitch assembly is provided. The keyswitch assembly includes a base plate, at least one pressing mechanism disposed on the base plate, a plurality of elastic members disposed on the base plate, and a keycap covering the at least one pressing mechanism and the plurality of elastic members. In the embodiments, a plurality of elastic members is disposed at equal intervals to support the keycap. By way of such configuration, the user experiences the same or similar hand feeling when pressing any point of the keycap. There is no difference in the pressing feel due for pressing the middle or two ends of the keycap. Meanwhile, the problem of the poor electrical conduction resulted from the deformation of the keycap may be avoided.

21 Claims, 18 Drawing Sheets

(56) References Cited

U.S. PATENT DOCUMENTS

| | | | |
|---|---|---|---|
| 2018/0025859 | A1 | 1/2018 | Chen |
| 2018/0074587 | A1* | 3/2018 | Liu ........................ H01H 13/85 |
| 2018/0197689 | A1 | 7/2018 | Snyder |
| 2018/0197692 | A1 | 7/2018 | Chen et al. |
| 2018/0197698 | A1 | 7/2018 | Chung et al. |
| 2018/0337005 | A1* | 11/2018 | Jhuang ............... H01H 13/7013 |

* cited by examiner

KEYSWITCH ASSEMBLY

CROSS REFERENCE TO RELATED APPLICATION

This application is a continuation in part of the U.S. patent application Ser. No. 16/368,349, filed on Mar. 28, 2019.

BACKGROUND

Technical Field

This present invention generally relates to the field of a keyswitch and, more particularly, to the structure of a keyswitch assembly.

Related Art

Keyboards are generally used for inputting texts. According to the mechanism design under a keyswitch of a keyboard, the keyboard can be generally divided into two categories, which are a thin film keyboard and a mechanical keyboard respectively. The pressing feeling of a general thin film keyboard lies in the cooperation of the mechanical structure between the rubber cap and the scissor-like linkage below the keyswitch. When the user presses the keyswitch, the rubber cap is compressed by the pressing force, so that the keyswitch is pressed down. While the user stops pressing the keyswitch, the restoring force of the rubber cap would cause a rebound to provide the restoring force, so as to raise the keyswitch. Accordingly, the pressing feeling is formed. The pressing feeling of a mechanical keyboard lies in the cooperation of the shaft and the spring structure under the keyswitch, and accordingly, the pressing feeling is through the combination of pressing force and restoring force of the spring.

However, when a keyswitch has a larger pressing area (such as a space bar), the restoring force of the keyswitch is insufficient, or the pressing feeling on the middle surface of the keyswitch is inconsistent with the pressing feeling at both ends of the keyswitch. Thus, the pressing feeling is poor. Also, the corner of the keyswitch is easily deformed due to the insufficient supporting force, resulting in poor electrical connection of the keyswitch and bad experience of using the keyboard.

SUMMARY

The embodiments of the present invention provides a keyswitch assembly to solve the problems of deformation, poor electrical conduction or poor pressing feeling of the keyswitch in the prior art.

In one embodiment, the keyswitch assembly includes a base plate, at least one pressing mechanism disposed on the base plate, a plurality of elastic members disposed on the base plate, a keycap covering the at least one pressing mechanism and the plurality of elastic members and a first supporting member disposed on the keycap.

In the embodiments, the first supporting member is disposed on the keycap, whereby the rigidity of the keycap is increased. When a user presses the keycap at any position, particularly either at a corner or at the center of the keycap, he/she can experience substantially the same or similar pressing feeling. In the meanwhile, the problem of the poor electrical conduction resulted from the deformation of the keycap can be solved by the increased rigidity.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
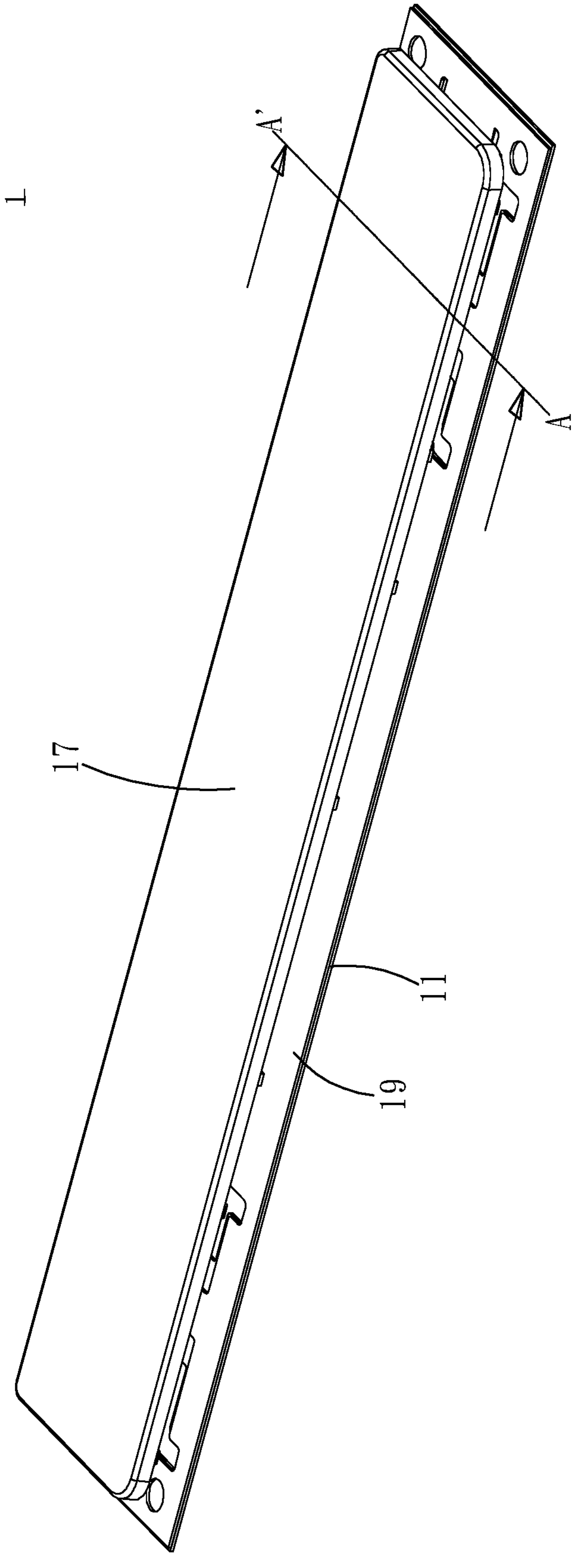
FIG. 1 shows the perspective view of the keyswitch assembly according to a first embodiment of the present application.
Figure 2:
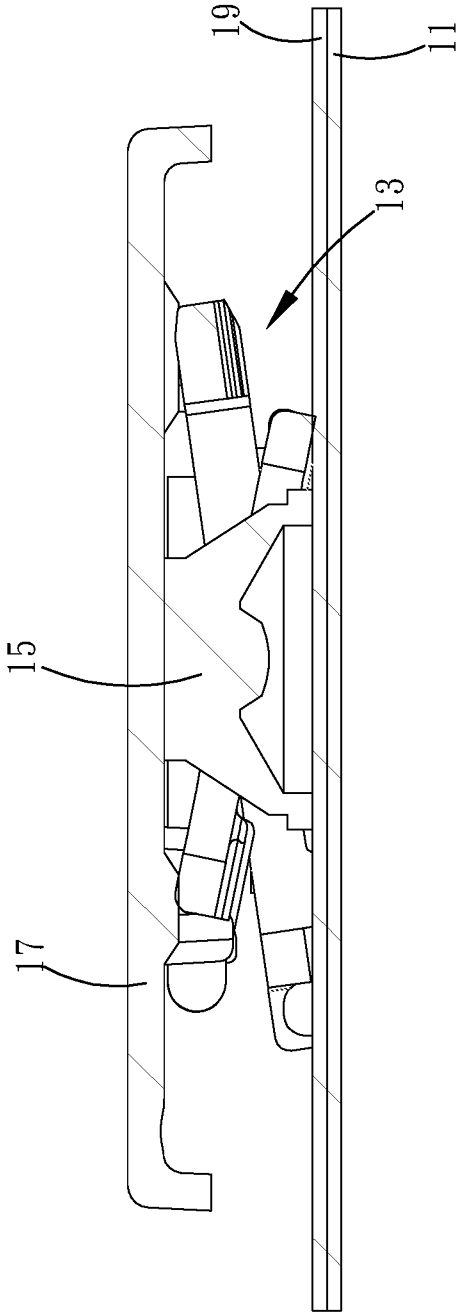
FIG. 2 shows an enlarged cross-sectional view along the line AA' in FIG. 1.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiments, the same reference numeral is used to refer to the same or similar elements throughout the application.

The present application provides a keyswitch assembly, which demonstrates as one of the keys in the keyboard. The plurality of elastic members of the keyswitch assembly provide adequate supporting for the keycap. When pressing a multi-unit keycap having a length substantially greater than a width (such as the "space bar" key), a user would not feel distinct tactile feedbacks no matter where the user presses the keycap. Also, the corner of the keycap will not be deformed by pressing, and each elastic member can trigger the corresponding circuit switch on the circuit board.

FIGS. 1 to 4 respectively show the perspective view, the enlarged cross-sectional view along the line AA' in FIG. 1, the exploded view, and the combination of the keyswitch assembly according to the first embodiment of the present application. As shown in the figures, the keyswitch 1 in this embodiment includes a base plate 11, at least one pressing mechanism 13, a plurality of elastic members 15, and a keycap 17. The at least one pressing mechanism 13 is disposed on the base plate 11. The plurality of elastic members 15 spaced with intervals is disposed on the base plate 11, and corresponds to the plurality of pressing mechanisms 13. The keycap 17 covers the at least one pressing mechanism 13 and the plurality of elastic members 15. The plurality of elastic members 15 supports the keycap 17. A circuit board 19 is further disposed on the surface of the base plate 11 facing the keycap 17. The circuit board 19 includes a plurality of switches 191 corresponding to the plurality of elastic members 15. The plurality of elastic members 15 are disposed on the plurality of switches 191.

In this embodiment, the number of the pressing mechanism 13 and the elastic member 15 are two. The two pressing mechanisms 13 are symmetrically disposed on the base plate 11. The two elastic members 15 are respectively dispose in the corresponding pressing mechanisms 13. Each of the elastic members 15 is, for example, positioned within an aperture confined by the corresponding pressing mechanism 13. The detailed structure of the base plate 11, the pressing mechanism 13, and the keycap 17 will be further described below.

Figure 3:
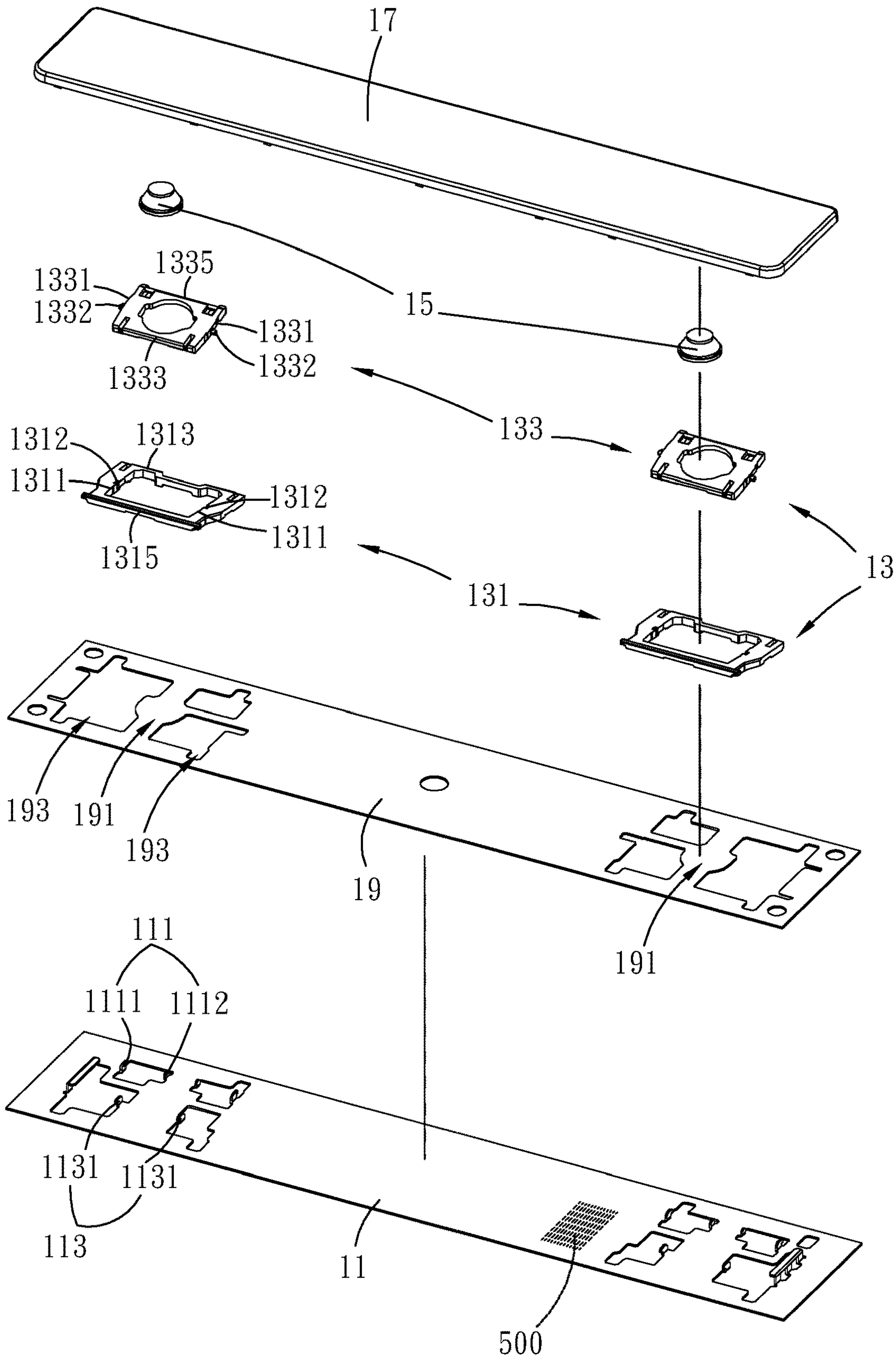
FIG. 3 shows an exploded view of the structure of the keyswitch assembly of the first embodiment of the present application.

The base plate 11 includes a fixing portion 111 and a limiting portion 113 at the position corresponding to the pressing mechanism 13. The fixing portion 111 is disposed at one side of the limiting portion 113. The fixing portion 111 is a combined structure having a plurality of fixing hooks 1111 and a plurality of fixing blocks 1112. The limiting portion 113 includes a plurality of limiting hooks 1131. In an embodiment, a surface of the base plate 11 is provided with an identifier 500, as shown in FIG. 3. The identifier 500 could be barcodes, two-dimensional codes (QR codes), three-dimensional codes, or other recognizable patterns, symbols, characters, and numerical codes directly formed on the bottom surface of the base plate 11, for example, by printing, spraying, laser engraving, polishing, stamping, or bonding. The identifier may include information such as production histories or manufacturing data of the keyboard product. As the multi-unit key, e.g., "space bar" key, occupies more space of the base plate 11, the identifier 500 might be arranged underneath the multi-unit key.

The circuit board 19 disposed on the base plate 11 includes a plurality of hollow portions 193. The fixing portion 111 and the limiting portion 113 pass through the hollow portion 193. That is, the plurality of fixing hooks 1111, the plurality of fixing blocks 1112, and the plurality of limiting hooks 1131 pass through the hollow portion 193.

The pressing mechanism 13 further includes a first bracket 131 and a second bracket 133. The two outer sides 1331 of the second bracket 133 are pivotally disposed on two inner sides 1311 of the first bracket 131 respectively. That is the first bracket 131 and the second bracket 133 are interlocked. The two outer sides 1331 of the second bracket 133 respectively includes bumps 1332. The two inner sides 1311 of the first bracket 131 respectively includes notches 1312. The bumps 1332 are fitted in the notches 1312. The first bracket 131 and the second bracket 133 are relatively pivotable. The first bracket 131 further includes a first outer side 1313 and a second outer side 1315. The second bracket 133 further includes a first inner side 1333 and a second inner side 1335. The first outer side 1313 and the first inner side 1333 are adjacent to the base plate 11, while the second outer side 1315 and the second inner side 1335 are adjacent to the keycap 17.

The first outer side 1313 of the first bracket 131 is disposed to the fixing portion 111. That is the inner side of the first outer side 1313 hooks to the plurality of fixed hooks 1111. The outer side of the first outer side 1313 is confined by the plurality of fixing blocks 1112. The first bracket 131 is pivoted to the base plate 11. The first inner side 1333 of the second bracket 133 engages with the limiting portion 113. That is, the inner side of the first inner side 1333 is confined by the limit hook 1131, such that the first inner side 1333 of the second bracket 133 is restricted to move inwardly.

Figure 4:
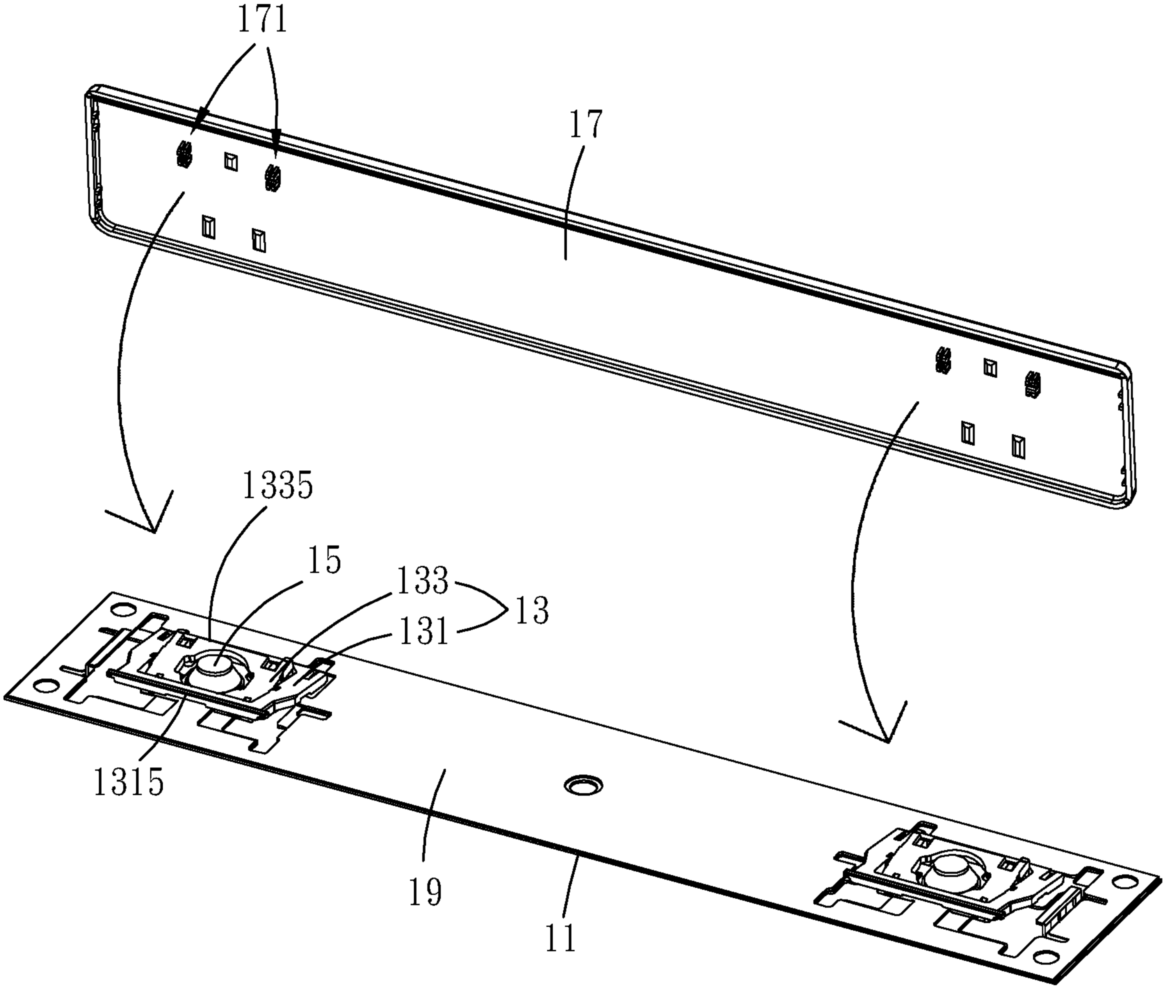
FIG. 4 shows the combination of the structure of the keyswitch assembly of the first embodiment of the present application.

Referring to FIG. 4, the inside of the keycap 17, e.g., the bottom surface of the keycap 17, has a buckle portion 171 corresponding to the second outer side 1315 of the pressing mechanism 13. The second outer side 1315 is fitted to the buckle portion 171. The first bracket 131 can pivot relative to the keycap 17. The second inner side 1335 of the pressing mechanism 13 directly abuts against the inner side of the keycap 17. The elastic member 15 is located in the second bracket 133.

When the user presses the keycap 17 of the keyswitch assembly 1, the keycap 17 moves downward and drives the pressing mechanism 13 and the elastic member 15. As the keycap 17 moves downward, the keycap 17 drives the first bracket 131 of the pressing mechanism 13 to pivot relative to the second bracket 133 of the pressing mechanism 13, such that a cross configuration of the first bracket 131 and the second bracket 133 transforms into an overlap configuration of the first bracket 131 and the second bracket 133. At the same time, the elastic member 15 is compressed by the keycap 17 downwardly to contact the switches 191 of the circuit board 19 on the base plate 11, so as to achieve electrical conduction inside the circuit board 19 and complete an input of the keyswitch. When the elastic member 15 is compressed, an upward supporting force for the keycap 17 can also be provided, and the deformation of the keycap 17 due to pressing can be effectively mitigated. When the user stops pressing the keycap 17, the compressed elastic member 15 restores to its original state. The elastic force of the elastic member 15 drives the keycap 17 to move upward. The keycap 17 drives the first bracket 131 and the second bracket 133 of the pressing mechanism 13 to return to the original cross configuration. By way of such configuration, the pressing force applied to the keycap 17 and the restoring force that the elastic member 15 restores the keycap 17 account for the pressing feeling.

The two elastic members 15 of the keyswitch assembly 1 in this embodiment are disposed under the keycap 17 with an interval therebetween. The two elastic members 15 stably provide the supporting force for the keycap 17, to provide sufficient restoring force for the keycap 17. When the user presses any spot/area or corner of the keycap 17, the pressing feeling is the same throughout the entire surface of the keycap 17, so that there should be no difference in the pressing feeling while directly pressing the middle or two distal sides of the keycap 17. The two pressing mechanisms 13 are connected between the base plate 11 and the keycap 17 to maintain the stability of the up-and-down movement of the keycap 17. The number of the pressing mechanisms 13 may be two or more. The number of the elastic members 15 should be equal to the number of the pressing mechanisms 13. The plurality of the elastic members 15 may be disposed on the base plate 11 at equal intervals or at different intervals, which should not limit the scope of the embodiment. In the embodiment that the plurality of the elastic members 15 are disposed on the base plate 11 at equal intervals, the plurality of elastic members 15 stably provide sufficient supporting force for multiple parts of the keycap 17. In other words, the parts located between two distal sides of the keycap 17 and the central part of the keycap 17 may be supported stably by the supporting force. The keyswitch assembly 1 of the present embodiment can also be provided with a single pressing mechanism 13 and a plurality of elastic members 15 separately disposed in the pressing mechanism 13. The plurality of the elastic members 15 may be disposed inside the pressing mechanism 13 at equal intervals or at different intervals.

Figure 5:
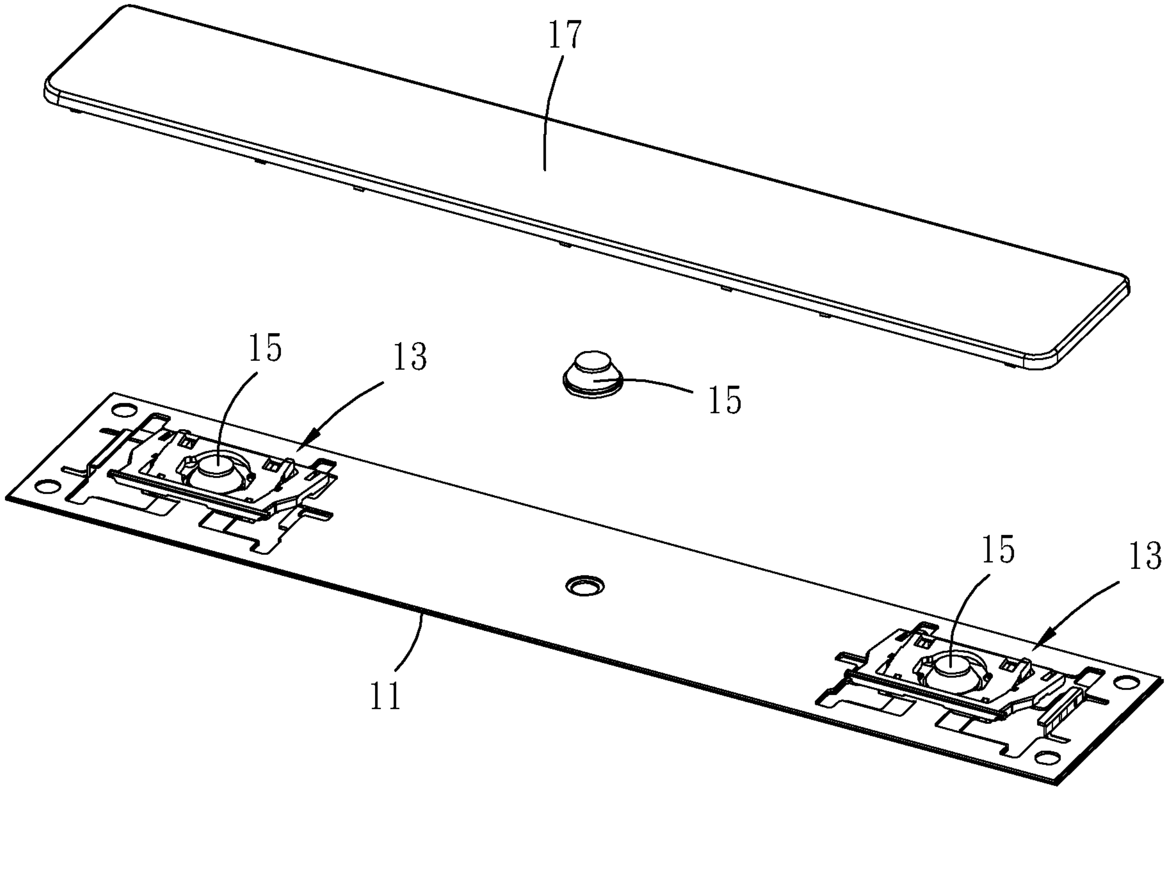
FIG. 5 shows the combination of the structure of the keyswitch assembly of the second embodiment of the present application.

FIG. 5 shows the combination of the keyswitch assembly according to the second embodiment of the present application. As shown in the figure, the difference between the present embodiment and the first embodiment is that the number of the pressing mechanisms 13 of the keyswitch assembly of the present embodiment is two, and the number of the elastic members 15 is three. The pressing mechanisms 13 are also symmetrically disposed on the base plate 11, and two of the three elastic members 15 are respectively disposed in the corresponding pressing mechanisms 13. The remaining elastic member 15 is disposed between the two elastic members 15. The three elastic members 15 are disposed on the base plate 11 at equal intervals. The keyswitch assembly 1 of the present embodiment significantly enhances the support in the middle of the keycap 17 as compared to the keyswitch assembly of the first embodiment. Certainly, one or more elastic members 15 could be arranged between the two pressing mechanisms 13 in other embodiments. The number of the pressing mechanism 13 and the elastic support 15 is determined by the area of the keycap 17, which should not limit the scope of the embodiment.

It can be seen from the above embodiments that the plurality of the elastic members 15 can be disposed at equal intervals (as shown in FIG. 5) or at different intervals on the base plate 11, and a plurality of elastic members 15 are disposed inside or/and outside the at least one pressing mechanism 13. The manner in which the plurality of elastic members 15 and the pressing mechanism 13 are arranged can be adaptively adjusted due to different requirements, which is not intended to limit the scope of the embodiments.

Figure 6A:
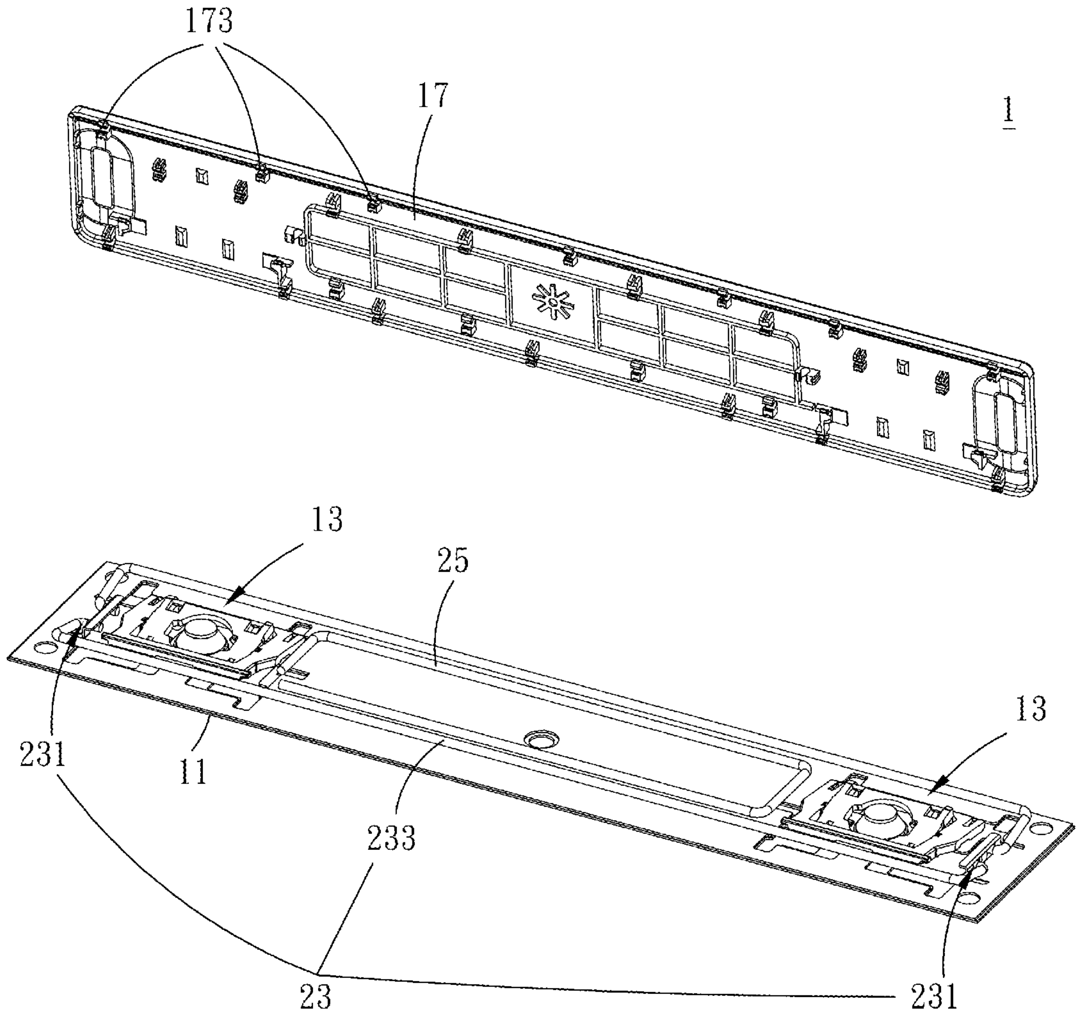
FIG. 6A shows the combination of the structure of the keyswitch assembly of the third embodiment of the present application.

FIG. 6A shows the combination of the keyswitch assembly according to the third embodiment of the present application. The difference between the present embodiment and the first embodiment is that the keyswitch assembly of the present embodiment further includes a balance supporting frame 23 and a supporting member 25. The balance supporting frame 23 is connected between the base plate 11 and the keycap 17. The balance supporting frame 23 includes two fixing portions 231 and two elastic brackets 233. The two fixing portions 231 are disposed on and connected to the base plate 11 corresponding to two opposite ends of the keyswitch assembly 1. In the present embodiment, the two fixing portions 231 are respectively disposed on two opposite sides corresponding to the pressing mechanism 13 and away from the center of the base plate 11. Two ends of each of the elastic brackets 233 are pivotally connected to the two fixing portions 231, and are also connected to the keycap 17. Each of the elastic brackets 233 is pivoted relative to the two fixing portions 231. When the user presses one end of the keycap 17, the pressed end of the keycap 17 moves downward and drives the two elastic brackets 233 to pivot relative to the two fixing portions 231, so as to drive the other end of the keycap 17 to move downward together. This shows that the balance supporting frame 23 can simultaneously drive the entire keycap 17 to move downward, thereby stabilizing the movement of the keycap 17 in the longitudinal direction. Certainly, the balance supporting frame 23 can simultaneously drive the entire keycap 17 to move upwards, thereby preventing the keycap 17 from being unbalanced during the movement.

In addition, the two fixing portions 231 of the balance supporting frame 23 can be selectively disposed on one side corresponding to the pressing mechanism 13. In other words, the two fixing portions 231 can be selectively disposed on the outer side of the pressing mechanism 13 (as shown in FIG. 6A) or on the inner side of the pressing mechanism 13. Both configurations can achieve the above effects. The above effects can also be achieved by only disposing a single elastic support 233 of the balance supporting frame 23.

The supporting member 25 is disposed on the surface of the keycap 17 facing the base plate 11 and disposed at the periphery of the two pressing mechanisms 13. The supporting member 25 might be located at a relatively central area of the keycap 17 between the two pressing mechanisms 13. The keycap 17 has an outer latching member 173 corresponding to the elastic bracket 233. The elastic bracket 233 is latched to the outer latching member 173 of the keycap 17. The supporting member 25 mainly increases the strength of the keycap 17 to avoid deformation resulting from the pressing. In this embodiment, the supporting member 25 could be a frame-like bar defining a rectangular loop with an opening. The supporting member 25 is, for example, made of a bent metal rod of which the cross section has a curved outline.

Figure 6B:
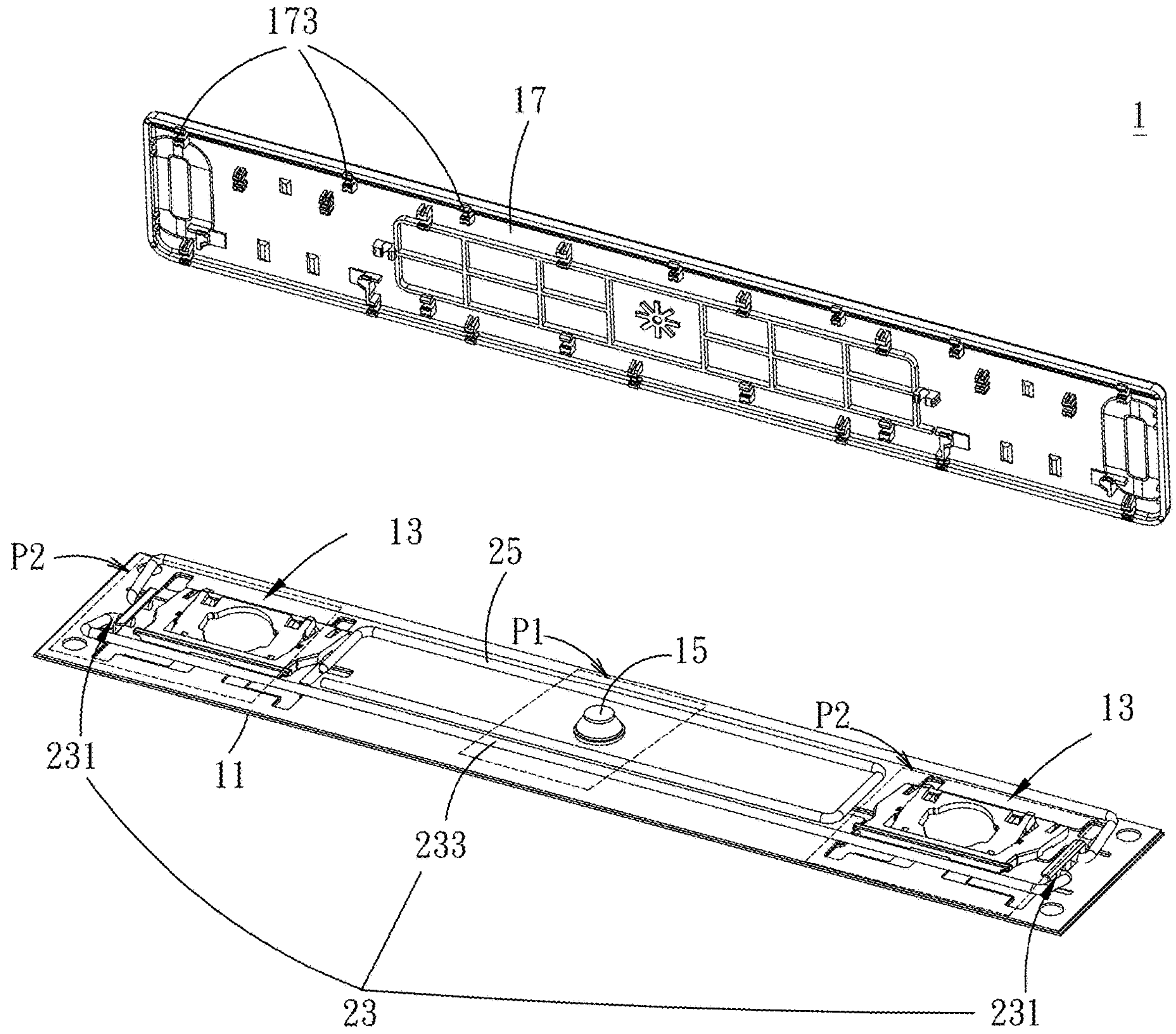
FIG. 6B shows the combination of the structure of the keyswitch assembly of the another embodiment of the present application.

FIG. 6B shows the combination of the structure of the keyswitch assembly of the another embodiment of the present application. The elastic member 15 is disposed at the first position P1 corresponding to two opposite lateral sides of the keycap in a longitudinal direction thereof, each of the elastic members is positioned with an aperture confined by each of the pressing mechanisms and above a respective switch of the circuit board, the first position P1 corresponds to the lateral side of the keycap, and the second position P2 corresponds to a center of the keycap.

Figure 7A:
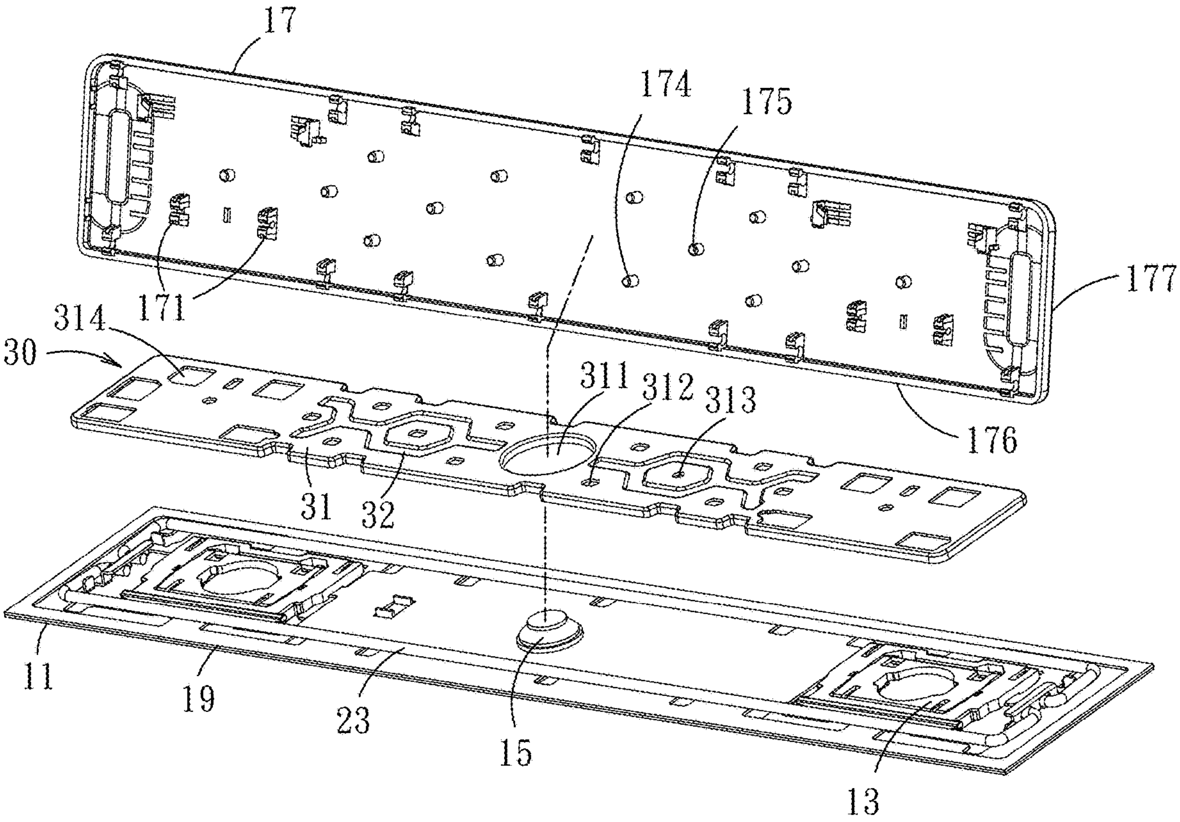
FIG. 7A shows an exploded view of the structure of the keyswitch assembly of the fourth embodiment of the present application.
Figure 8:
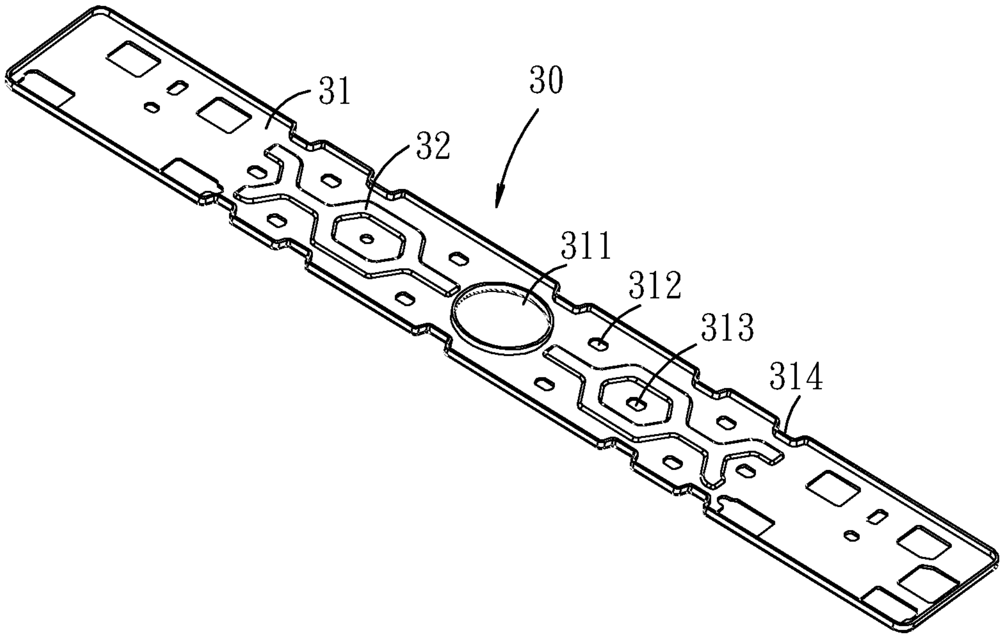
FIG. 8 is a perspective view of a first supporting member of the keyswitch assembly of FIG. 7A, wherein a rear surface of the first supporting member is shown.

Referring to FIGS. 7A and 8, an exploded view of the keyswitch assembly according to the fourth embodiment of the present application and a perspective view of the first supporting member are illustrated. Likewise, the same reference numbers are used in the drawings and the description to refer to the same or like part. As shown in FIGS. 7A and 8, the keyswitch assembly of the present embodiment further includes a first supporting member 30 disposed on the bottom surface of the keycap 17, e.g., a surface of the keycap 17 facing the pressing mechanisms 13 and the elastic member 15. The first supporting member 30 is implemented by a metal plate which covers at least 50% of the bottom surface of the keycap 17. In an embodiment, at least 70% of the bottom surface of the keycap 17 could be occupied by the first supporting member 30. The first supporting member 30, as shown in FIG. 7A, may cover almost the entire area of the bottom surface of the keycap 17 for enhanced reinforcement. In the present embodiment, two pressing mechanisms 13 and one elastic member 15 are disposed on the base plate 11. The elastic member 15 is disposed outside the pressing mechanisms 13 and located therebetween. The first supporting member 30 corresponds to and covers the pressing mechanisms 13 and the elastic member 15.

The first supporting member 30 includes a first main body 31 and first ribs 32. In the present embodiment, the first main body 31 is made of a rectangular metal plate, and the first ribs 32 are disposed on a surface of the first main body 31 facing the pressing mechanisms 13 and the elastic member 15. The first ribs 32 protruding from the surface of the first main body 31 could be located between the two pressing mechanisms 13. In the present embodiment, the first ribs 32 are constituted by multiple connected hexagons, but the structure of the first ribs 32 is not limited thereto. An orthographic projection area of the first ribs 32 projected on the circuit board 19 in a pressing direction of the keyswitch assembly does not overlap an orthographic projection area of the elastic member 15 projected on the circuit board 19, so that the first ribs 32 could not interfere with the elastic member 15 when the keycap 17 is pressed down. In addition, the first supporting member 30 further includes a flange 314 disposed on the peripheral rim of the first main body 31 as shown in FIG. 8. The flange 314 protrudes from the surface of the first main body 31 in the same direction as the first rib 32.

Figure 7B:
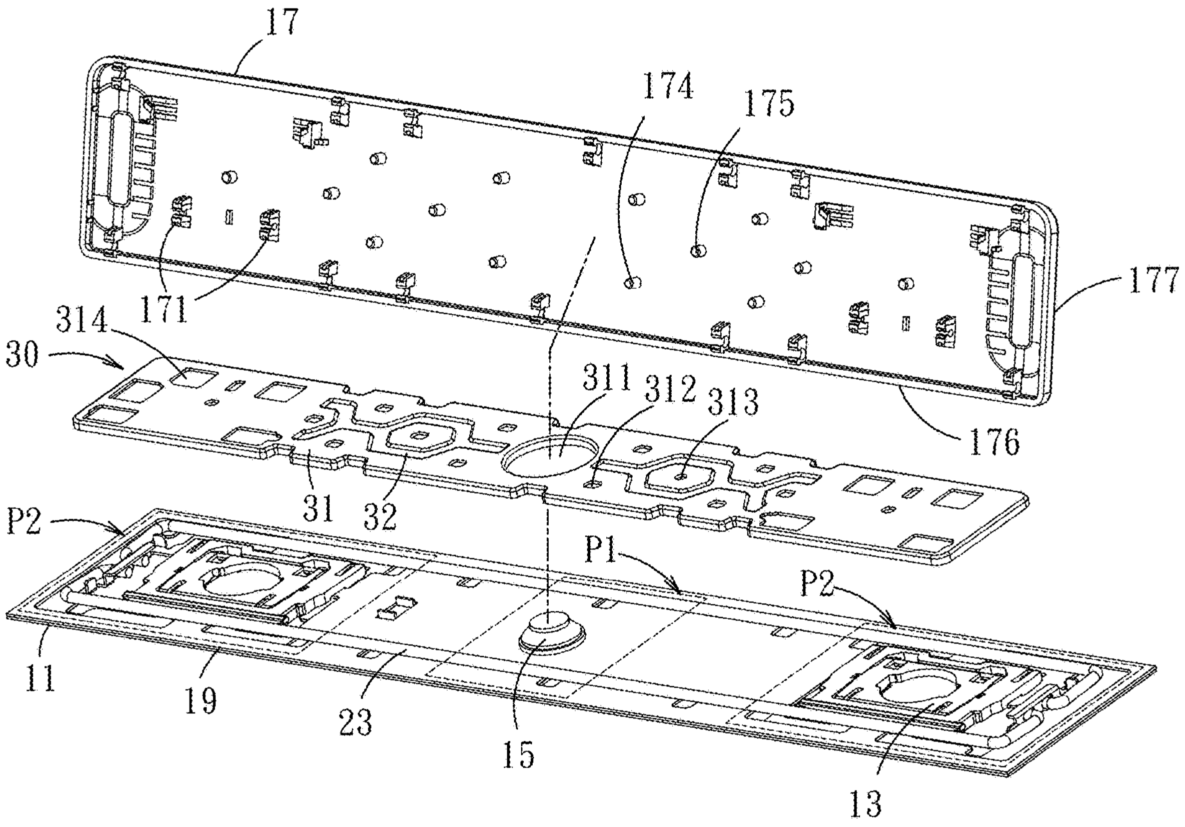
FIG. 7B shows a schematic view of the elastic member passing through the through hole and abutting the keycap.

The first main body 31 has a through hole 311, a plurality of first joining holes 312, a plurality of first positioning holes 313 and a plurality of openings 314. As shown in FIG. 7B, a dotted line is represented the elastic member 15 passing through the through hole 311 and abutting the keycap 17. The through hole 311 is formed at a position corresponding to the elastic member 15. The elastic member 15 extends through the through hole 311 and props against the keycap 17. The keycap 17 includes joining members 174 and positioning members 175. The positioning member 175 extends through the first positioning holes 313, whereby the first main body 31 is positioned to the keycap 17. In the present embodiment, the positioning member 175 is a projecting post which has a diameter substantially equal to or less than that of the first positioning hole 313. The openings 314 is formed at a position corresponding to the engaging portion protruding from the bottom of the keycap 17. When the first main body 31 is positioned to the keycap 17 through the positioning members 175 and the first positioning holes 313, the joining members 174 are disposed in the first joining holes 312 respectively. In the present embodiment, the joining member 174 is a hot-melt column. The joining member 174 is pressed and heated to be turned into the melt state. The melted joining member 174 then fills the first joining holes 312 and covers a portion of the first main body 31. When the melted joining member 174 is cured, a T-shaped joining member 174 is formed, and the first main body 31 is secured to the keycap 17 by the T-shaped joining member 174.

As the first supporting member 30 is secured to the keycap 17, the rigidity of the keycap 17 is increased, whereby the user can experience the same or similar pressing feeling when he/she presses the keycap 17 at any position thereof, particularly either at the corner or at the center. In addition, the problem of the poor electrical conduction resulted from the deformation of the keycap can be solved by the increased rigidity. The first ribs 32 can further enhance the rigidity of the first supporting member 30. Since the first ribs 32 are disposed at the middle portion of the first supporting member 30 and the elastic member 15 props against the center of the keycap 17, the first ribs 32 can prevent the deformation of the keycap 17 when the corner of the keycap 17 is pressed. In the present embodiment, the keycap 17 has two opposite long lateral sides 176 and two opposite short lateral sides 177 connected to the long lateral sides 176. The keycap 17 has an upward curved shape along the long lateral sides 176 so that a distance of each short lateral side 177 to the base plate 11 is larger than that of the center of the keycap 17 to the base plate 11. Such a keycap 17 of the present embodiment collocating the elastic member 15 at the center of the keycap 17 provides the same or similar pressing feeling either at the corner or at the center.

Figure 11:
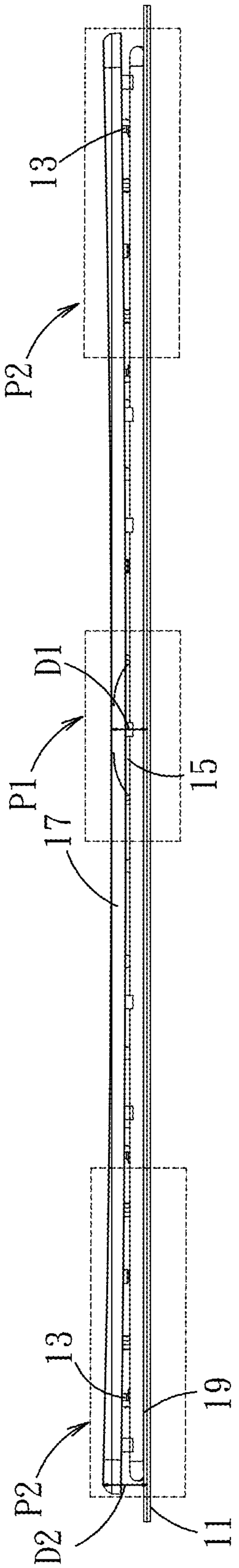
FIG. 11 is a front view of the keyswitch assembly according to the fourth embodiment of the present application.

Referring to FIG. 11 that illustrates a schematic front view of the keyswitch assembly. As shown in FIGS. 7B and 11, a distance between a top surface of the keycap 17 and a top surface of the base plate 11 at a first position P1 corresponding to the elastic member 15 is defined as a first distance D1, while a distance between the top surface of the keycap 17 and the top surface of the base plate 11 at a second position P2 that is distal to the elastic member 15 is defined as a second distance D2. The first distance D1 is less than the second distance D2, and the difference between the first distance D1 and the second distance D2 ranges from 0.05 mm to 0.4 mm. In the present embodiment, since the first position P1 corresponding to the elastic member 15 is located in the center of the keycap 17 and the second position P2 distal to the elastic member 15 is located on a lateral side of the keycap 17, the keycap 17 would be provided with a slightly concave surface with respect to the base plate 11. That is, the keycap 17 could have the surface that curves downwards or toward the base plate 11. As the distance D2 corresponding to the lateral side greater than the distance D1 corresponding to the elastic member 15 that provides elastic resistance when the keycap 17 is pressed, the consistent tactile feedback can be obtained throughout the keycap 17 due to the longer travel distance where no elastic member 15 is disposed.

Figure 9A:
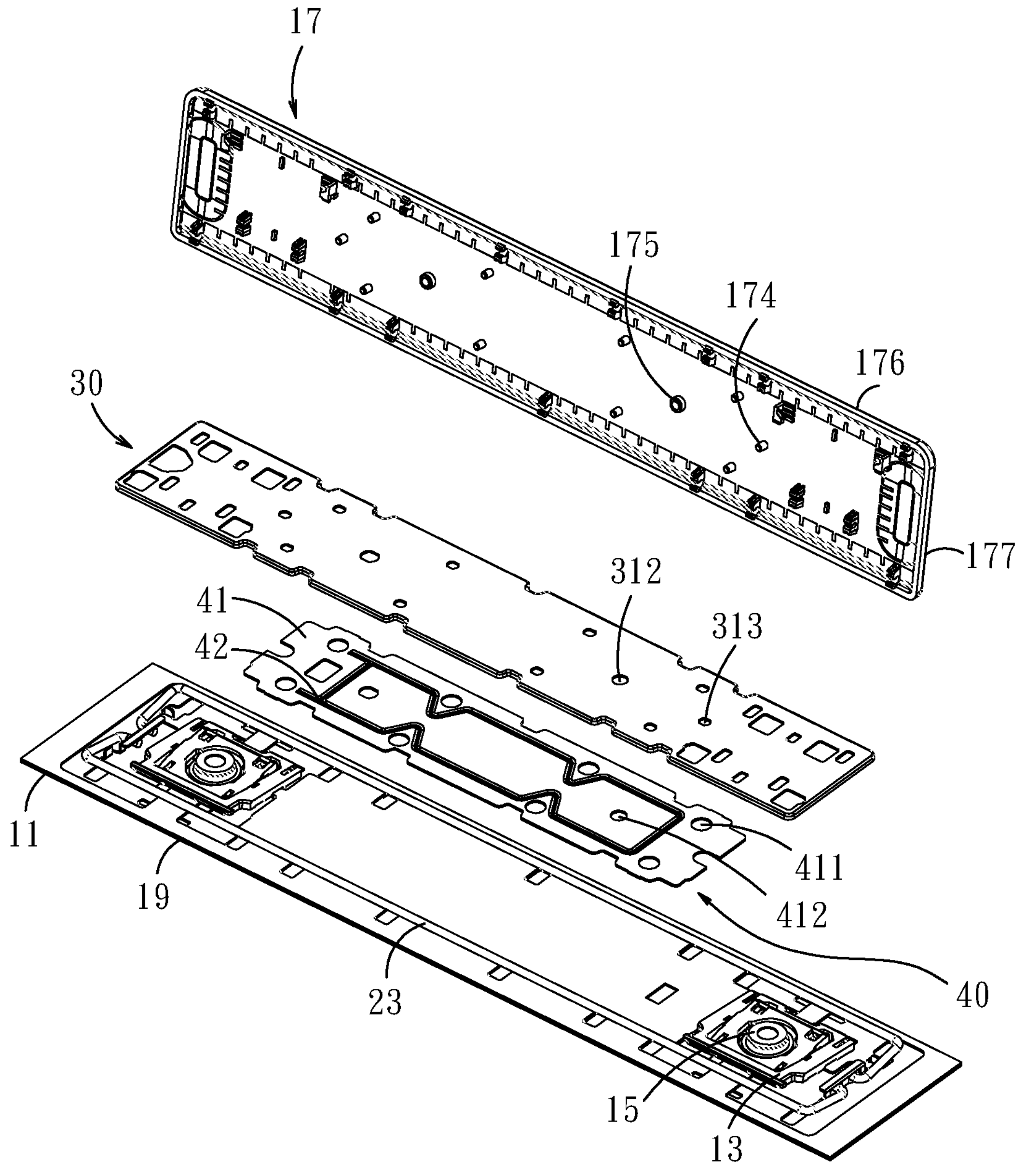
FIG. 9A shows an exploded view of the structure of the keyswitch assembly of the fifth embodiment of the present application.
Figure 9B:
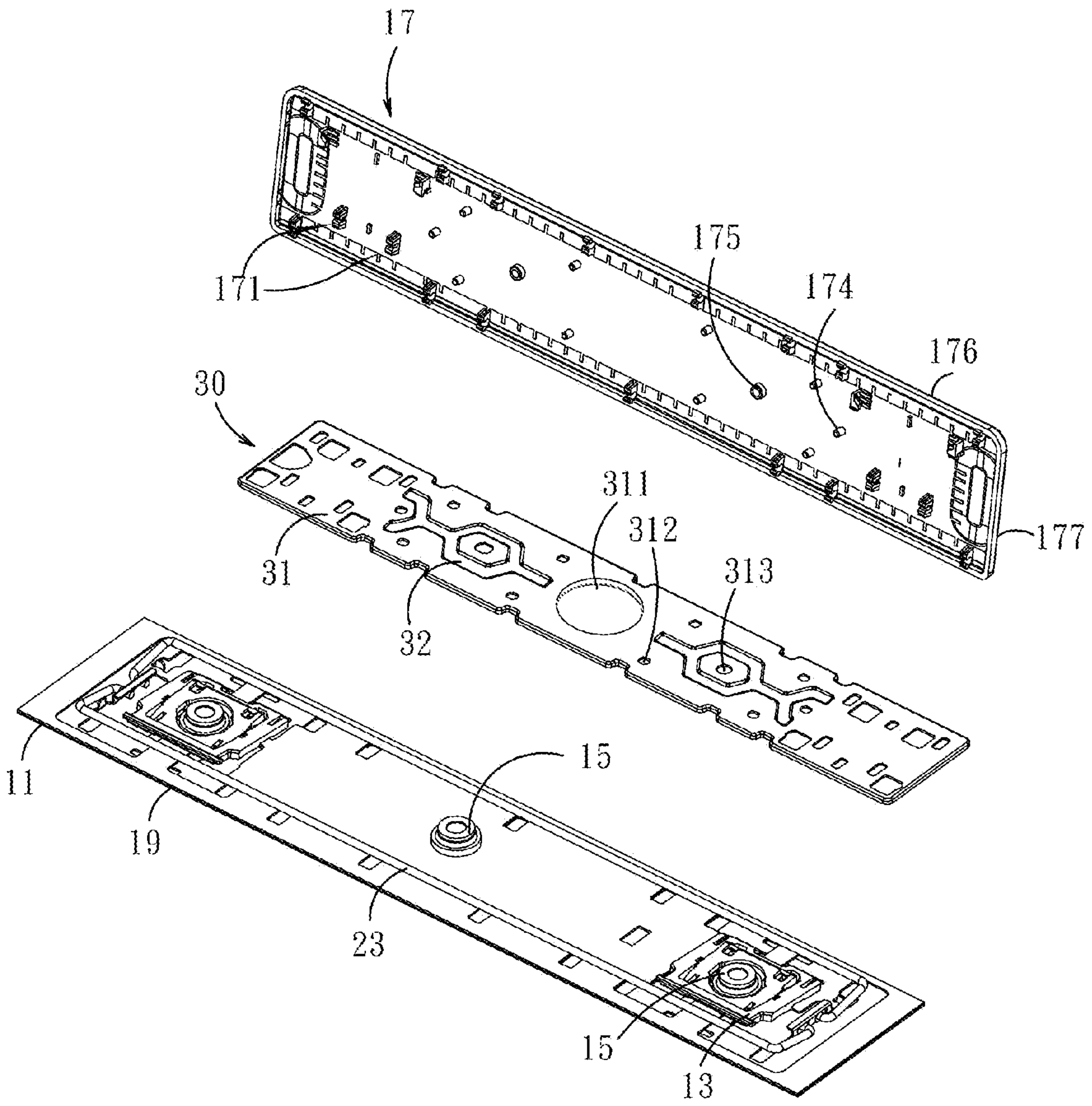
FIG. 9B shows an exploded view of the structure of the keyswitch assembly of sixth embodiment of the present application.
Figure 10:
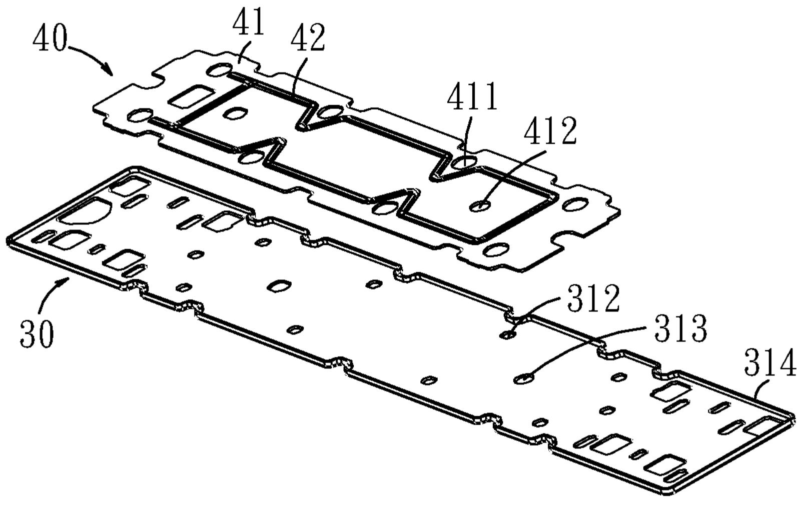
FIG. 10 is a perspective view of a first supporting member and the second supporting member of the keyswitch assembly of FIG. 9A, wherein a rear surface of the first supporting member and a rear surface of the second supporting member are shown.

Referring to FIGS. 9A and 10, an exploded view of the keyswitch assembly according to the fifth embodiment of the present application, and a perspective view of the first supporting member and the second supporting member are illustrated. Since a portion of the structure of the present embodiment is the same as that of the previous embodiments, the identical members are denoted by the same numerical and the description thereof is not repeated hereinafter. As shown in FIG. 9A, the keyswitch assembly of the present embodiment includes two pressing mechanisms 13 and two elastic members 15. The elastic members 15 are disposed within the pressing mechanisms 13 respectively. As shown in FIG. 10, the present embodiment further includes a second supporting member 40. The second supporting member 40 is disposed at a surface of the first supporting member 30 facing the pressing mechanisms 13 and the elastic members 15. The first supporting member 30 has no ribs. The second supporting member 40 is constituted by a metal plate which covers an area more than half of the first supporting member 30. The second supporting member 40 includes a second main body 41 and second ribs 42. The second supporting member 40 is smaller than the first supporting member 30 and located between the pressing mechanisms 13. The second ribs 42 are disposed on a surface of the second main body 41 facing the pressing mechanisms 13 and the elastic members 15, thereby increasing the rigidity of the second supporting member 40. Referring to FIG. 9B, an exploded view of the keyswitch assembly according to the sixth embodiment of the present application, and a perspective view of the first supporting member, first ribs and elastic support are illustrated. The keyswitch assembly of the present embodiment is the first supporting member 30 having the first ribs 32 and the one of elastic support 15 disposed outside the pressing mechanisms and located therebetween.

Figure 9C:
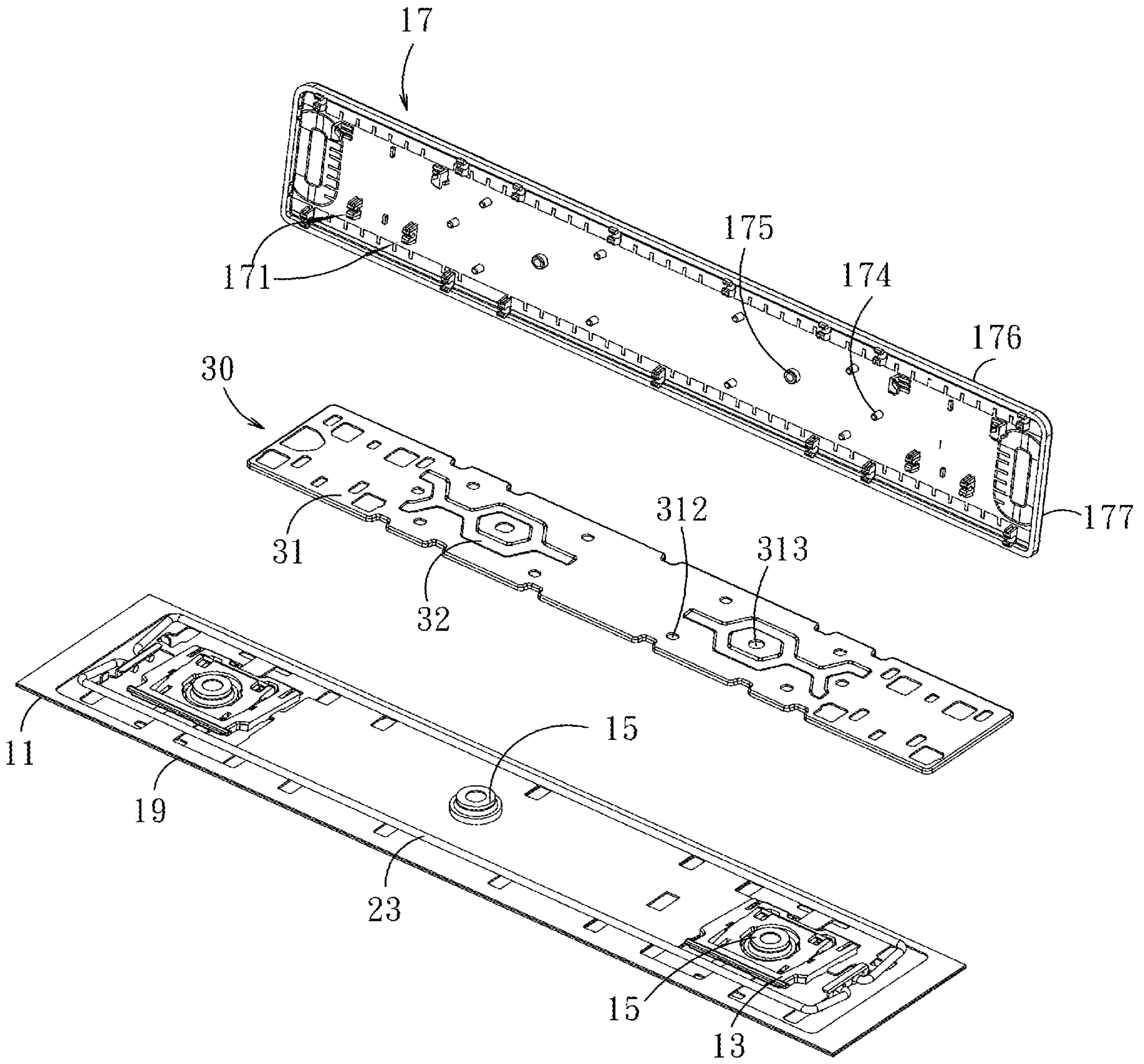
FIG. 9C shows an exploded view of the structure of the keyswitch assembly of seventh embodiment of the present application.

FIG. 9C, an exploded view of the keyswitch assembly according to seventh embodiment of the present application, and a perspective view of the first supporting member, first ribs and elastic support are illustrated. The at least one elastic member 15 is disposed outside the pressing mechanisms 13 and located therebetween, and the first supporting member 30 covers the at least one elastic member 15 and the pressing mechanisms 13.

Figure 9D:
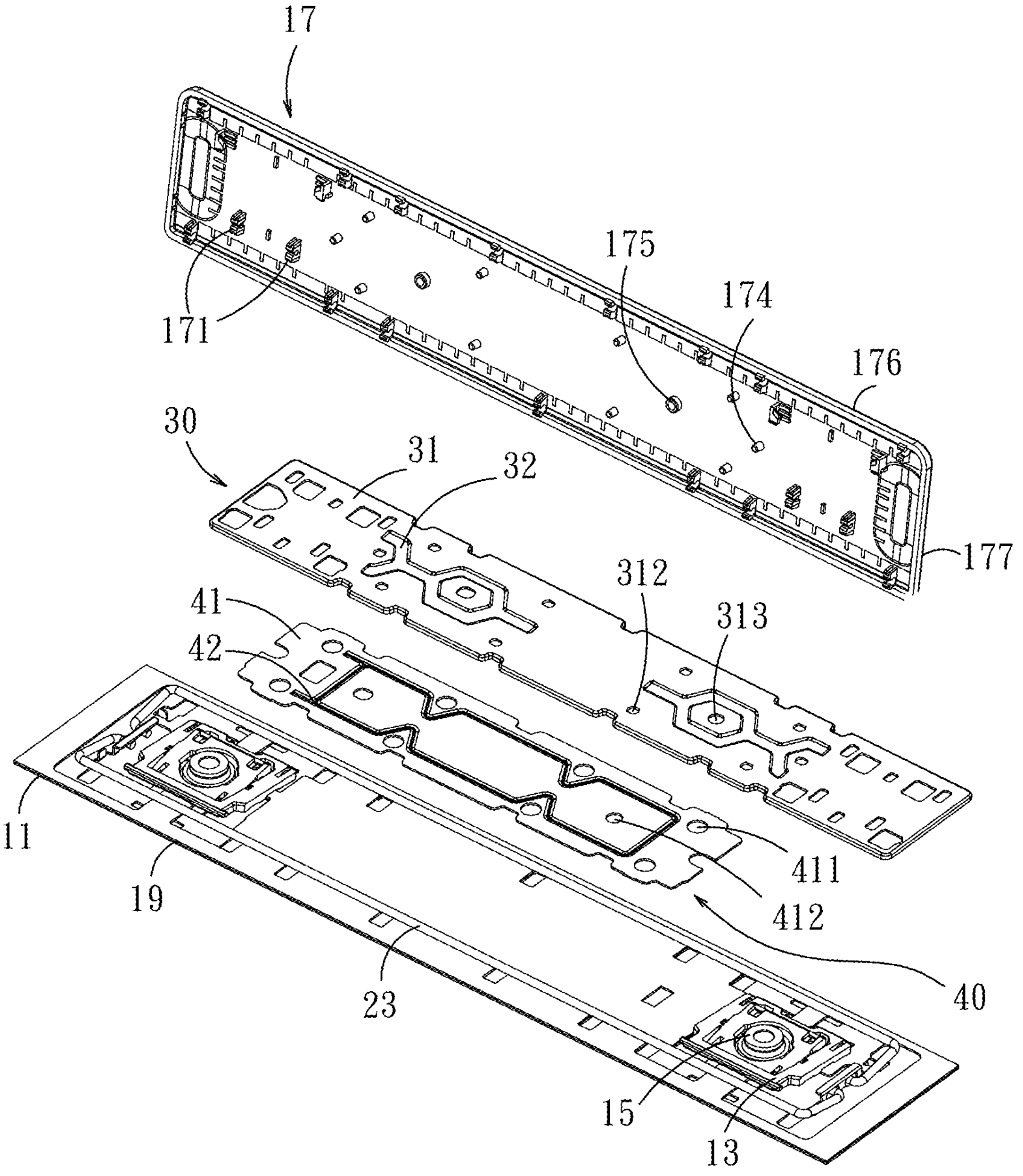
FIG. 9D shows an exploded view of the structure of the keyswitch assembly of eighth embodiment of the present application.

FIG. 9D, an exploded view of the keyswitch assembly according to the eighth embodiment of the present application, and a perspective view of the first supporting member, first ribs and elastic support are illustrated. The keyswitch assembly of the present embodiment is the first supporting member 30 having the first ribs 32 and the one of elastic support 15 disposed outside the pressing mechanisms and located therebetween.

The first supporting member 30 and the second supporting member 40 together can further increase the rigidity of the keycap 17, whereby the user can experience the same or similar pressing feeling when he/she presses the keycap 17 at any position thereof, particularly either at the corner or at the center. In addition, the problem of the poor electrical conduction resulted from the deformation of the keycap 17 can be solved by the increased rigidity.

The second main body 41 includes a plurality of second joining holes 411 and a plurality of second positioning holes 412. The second positioning holes 412 are aligned with the first positioning holes 313, and the positioning members 175 extend through the second positioning holes 412 and the first positioning holes 313 to position the first supporting member 30 and the second supporting member 40. The second joining holes 411 are aligned with the first joining holes 312. The joining member 174 are disposed in the second joining holes 411 and the first joining holes 312 when the first supporting member 30 and the second supporting member 40 are positioned to the keycap 17. The joining member 174 is pressed and heated to be turned into the melt state. The melted joining member 174 fills the first joining holes 312 and the second joining holes 411, and covers a portion of the second main body 41 as well. When the melted joining member 174 is cured, a T-shaped joining member 174 is formed, and the first main body 31 and the second main body 41 are secured to the keycap 17 by the T-shaped joining member 174. The keycap 17 has a downward curved shape along the long lateral sides 176 so that a distance of each short lateral side 177 to the base plate 11 is smaller than that of the center of the keycap 17 to the base plate 11. Such a keycap 17 of the present embodiment collocating the two elastic members 15 at the position of the pressing mechanism 13 provides the same or similar pressing feeling either at the corner or at the center.

Figure 7C:
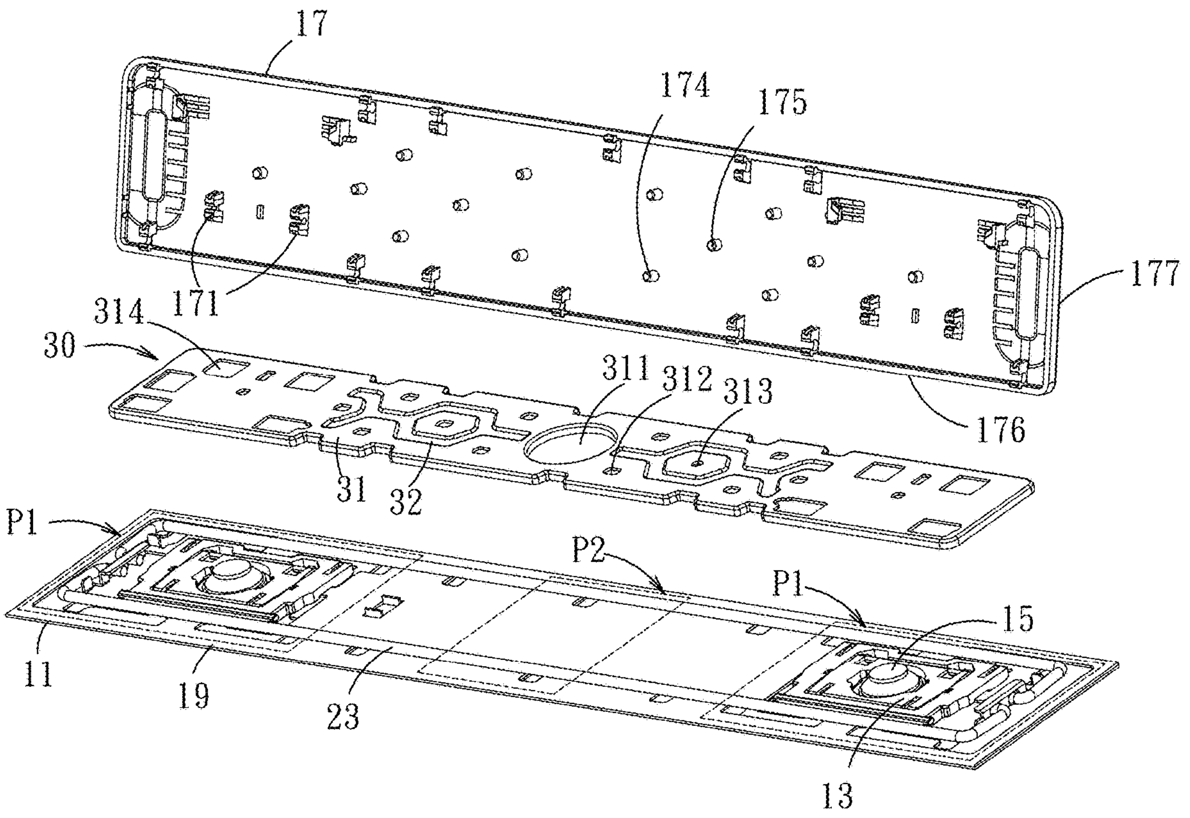
FIG. 7C shows a schematic view of the elastic member passing through the through hole and abutting the keycap.
Figure 12:
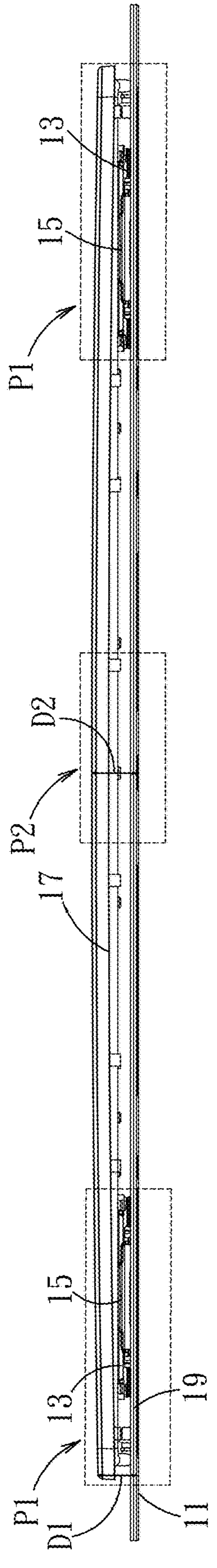
FIG. 12 is a front view of the keyswitch assembly according to the fifth embodiment of the present application.

Referring to FIG. 12 that illustrates a schematic front view of the keyswitch assembly. As shown in FIGS. 7C and 12, a distance between the top surface of the keycap 17 and the top surface of the base plate 11 at the first position P1 corresponding to the elastic member 15 is defined as the first distance D1, while a distance between the top surface of the keycap 17 and the top surface of the base plate 11 at the second position P2 distal to the elastic member 15 is defined as the second distance D2. The first distance D1 is less than the second distance D2, and the difference therebetween ranges from 0.05 mm to 0.4 mm. In the present embodiment, the first position P1 corresponding to the elastic member 15 is located on the lateral side of the keycap 17, and the second position P2 corresponds to the center of the keycap 17 which is distal to the elastic member 15, and therefore, the keycap 17 has a slightly convex surface with respect to the base plate 11. The keycap 17 could be provided with the top or bottom surface that curves upwards. Likewise, as the elastic member 15 provides elastic resistance when the keycap 17 is pressed, the arrangement of the shorter travel distance of the keycap 17 where the elastic member 15 is disposed could provide the uniform tactile feedback throughout the surface of the pressed keycap 17.

It is noted that the configuration of the supporting member fasten to the keycap 17 is not limited by the above description. In another embodiment, the first supporting member 30 elaborated in FIGS. 9A and 9B is not required; that is, the second supporting member 40 is directly engaged with the bottom surface of the keycap 17. With the arrangement of the second ribs 42 and adequate coverage of the keycap 17, the second supporting member could enhance the mechanical stability and rigidity of the keycap 17. Accordingly, the reinforced keycap 17 together with the multiple elastic members 15 could enable the multi-unit keycap 17 to stably travel up and down, and mitigate an uneven performance of electrical conduction corresponding to the corners of the keycap 17.

In summary, according to the embodiments, the first supporting member is disposed on the keycap, whereby the rigidity of the keycap is increased. When a user presses the keycap at any position, particularly either at a corner or at the center of the keycap, he/she can experience substantially the same or similar pressing feeling. In the meanwhile, the problem of the poor electrical conduction resulted from the deformation of the keycap can be solved by the increased rigidity.

It is to be understood that the term "comprises", "comprising", or any other variants thereof, is intended to encompass a non-exclusive inclusion, such that a process, method, article, or device of a series of elements not only includes those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A keyswitch assembly, comprising:

a base plate;

a circuit board disposed on the base plate;

a keycap disposed on the circuit board;

at least one pressing mechanism movably connected to the base plate and the keycap respectively;

at least one elastic member disposed between the keycap and the circuit board, wherein a first distance between a top surface of the keycap and a top surface of the base plate at a first position corresponding to the at least one elastic member is less than a second distance between the top surface of the keycap and the top surface of the base plate at a second position distal to the at least one elastic member; and a supporting member engaged with a bottom surface of the keycap, wherein the supporting member has a rib protruding from a main body of the supporting member;

a balance supporting frame surrounding the supporting member and being movably connected to the base plate and the keycap respectively; and wherein the supporting member made of a metal plate covers at least 50% of the bottom surface and has an opening corresponding to an engaging portion protruding from the bottom surface of the keycap to couple with the at least one pressing mechanism.

2. The keyswitch assembly according to claim 1, comprising two elastic members and two pressing mechanisms, wherein each of the elastic members corresponding to the respective first position is positioned within an aperture confined by each of the pressing mechanisms and above a respective switch of the circuit board, the two first positions correspond to two opposite lateral sides of the keycap in a longitudinal direction, and the second position is located between the two first positions.

3. The keyswitch assembly according to claim 1, wherein the rib is not in contact with the at least one elastic member.

4. The keyswitch assembly according to claim 1, wherein the elastic member is disposed at a position corresponding to a center of the keycap and located between the at least one pressing mechanism, the first position corresponds to the center of the keycap, and the second position corresponds to two opposite lateral sides of the keycap in a longitudinal direction thereof.

5. The keyswitch assembly according to claim 1, wherein the rib protruding from the main body extends toward the base plate and does not overlap the at least one elastic member on the circuit board in the pressing direction.

6. The keyswitch assembly according to claim 1, wherein a difference between the first distance and the second distance ranges from 0.05 mm to 0.4 mm.

7. The keyswitch assembly according to claim 1, wherein a surface of the base plate has an identifier.

8. A keyswitch assembly, comprising:

a base plate;

at least one pressing mechanism disposed on the base plate;

at least one elastic member disposed on the base plate;

a keycap covering the at least one pressing mechanism and the at least one elastic member, and wherein the keycap has at least one buckle portion, the at least one buckle portion is engaged with the at least one pressing mechanism; and a first supporting member joined to the keycap and partially overlapping the at least one pressing mechanism, wherein the first supporting member comprises a rib protruding from a bottom surface of the first supporting member, and wherein the rib does not cover the elastic member in a pressing direction and does not directly contact the at least one pressing mechanism.

9. The keyswitch assembly according to claim 8, comprising two pressing mechanisms, wherein the at least one elastic member is disposed outside the pressing mechanisms and located therebetween, and the first supporting member covers the at least one elastic member and the pressing mechanisms.

10. The keyswitch assembly according to claim 9, wherein the first supporting member comprises a first main body secured to a bottom surface of the keycap, and wherein the rib protruding from a surface of the first main body is facing the base plate.

11. The keyswitch assembly according to claim 10, wherein the rib is located between the pressing mechanisms and corresponds to the at least one elastic member.

12. The keyswitch assembly according to claim 10, wherein the first main body further comprises a plurality of first joining holes, and the keycap comprises a plurality of joining members protruding from the bottom surface of the keycap and corresponding to the first joining holes respectively.

13. The keyswitch assembly according to claim 10, wherein the first main body further comprises at least one first positioning hole, the keycap comprises at least one positioning member protruding from the bottom surface of the keycap and corresponding to the at least one first positioning hole.

14. The keyswitch assembly according to claim 9, wherein the keycap has a curved shape and comprises a center and two opposite lateral sides, a distance from each of the opposite lateral sides to the base plate is larger than a distance from the center to the base plate, and the at least one elastic member corresponds to the center of the keycap.

15. The keyswitch assembly according to claim 8, wherein the first supporting member comprises a through hole, and the at least one elastic member abuts the keycap through the through hole.

16. The keyswitch assembly according to claim 8, further comprising a second supporting member joined to the first supporting member and the keycap, wherein the first supporting member is disposed between the keycap and the second supporting member.

17. The keyswitch assembly according to claim 16, comprising two pressing mechanisms and a plurality of elastic members, wherein two elastic members are disposed within the pressing mechanisms respectively, the elastic members abut the first supporting member, and the second supporting member is disposed between two pressing mechanisms.

18. The keyswitch assembly according to claim 17, wherein the second supporting member comprises a second main body and a rib protruding from a surface of the second main body facing the elastic members.

19. The keyswitch assembly according to claim 17, wherein the first supporting member comprises a first main body, the first main body further comprises a plurality of first joining holes, the second supporting member comprises a second main body, the second main body comprises a plurality of second joining holes aligned with the first joining holes respectively, the keycap comprises a plurality of joining members disposed in the first joining holes and the second joining holes respectively to secure the first supporting member and the second supporting member to the keycap.

20. The keyswitch assembly according to claim 19, wherein the first supporting member comprises a plurality of first positioning holes, the second main body comprises a plurality of second positioning holes aligned with the first positioning holes respectively, and the keycap comprises a plurality of positioning members extending through the first and second positioning holes.

21. The keyswitch assembly according to claim 17, wherein the keycap has a curved shape and comprises a center and two opposite lateral sides, a distance from each of the opposite lateral sides to the base plate is smaller than a distance from the center to the base plate, and two elastic members are arranged on respective outer sides of the center of the keycap.

* * * * *